(No Model.)
H. D. HEDGER.
VELOCIPEDE HANDLE.
No. 379,955. Patented Mar. 27, 1888.
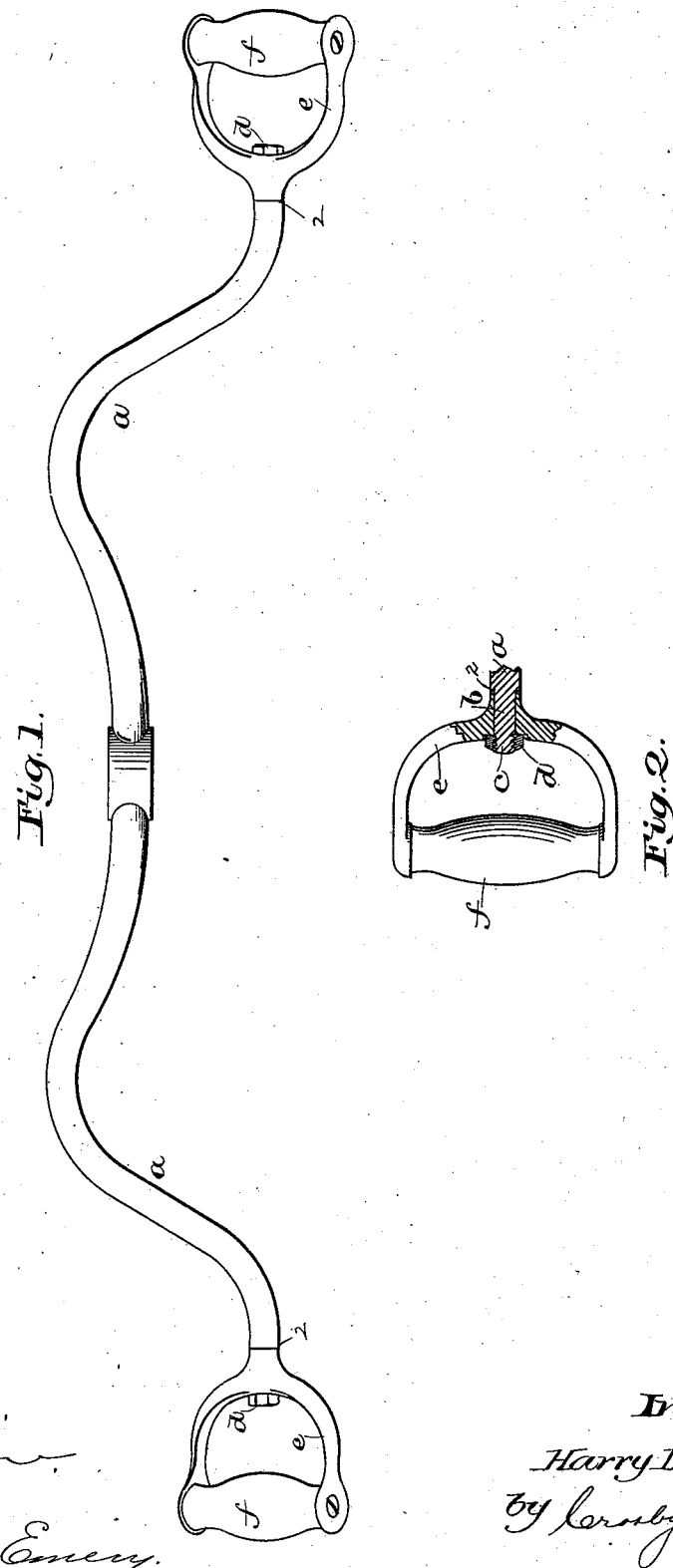
Witnesses,
Inventor,
Harry D. Hedger.
By Crosby & Gregory,
Attys.

UNITED STATES PATENT OFFICE.

HARRY D. HEDGER, OF BOSTON, MASSACHUSETTS.

VELOCIPEDE-HANDLE.

SPECIFICATION forming part of Letters Patent No. 379,955, dated March 27, 1888.

Application filed March 14, 1887. Serial No. 230,751. (No model.)

*To all whom it may concern:*

Be it known that I, HARRY D. HEDGER, of Boston, county of Suffolk, and State of Massachusetts, have invented an Improvement in Velocipede-Handles, of which the following description, in connection with the accompanying drawings, is a specification, like letters on the drawings representing like parts.

This invention has for its object to provide a velocipede handle bar with handles commonly termed "spade-handles," and with means for adjusting them with relation to the handle-bar.

The invention consists in the combination, with the handle-bar, either straight or curved, of spade-handles attached to the ends of the handle-bar, and an adjusting device for each handle, whereby it may be firmly secured at any desired angle with relation to the handle-bar or to the steering-fork, to which the handle-bar is applied.

The spade-handle is herein shown as having a socketed shank which fits loosely upon the reduced end of the handle-bar, and the said reduced end is made of sufficient length to project through the socket of the shank, and is screw-threaded to receive a nut, which latter, when tightened, firmly secures the handle to the handle-bar.

Figure 1 shows in front elevation a velocipede handle-bar provided with adjustable spade-handles, and Fig. 2 a front elevation and partial section of one of the handles and a portion of the handle-bar.

The handle-bar $a$ is herein shown as bent in usual form; but it may be made straight or otherwise, if desired. Each end of the handle-bar $a$ is reduced in diameter, as at $b$, (see Fig. 2,) to form a shoulder, 2. The extreme ends of the handle-bar $a$ are screw-threaded, as at $c$, to receive a nut, $d$.

The handle of the form commonly termed a "spade-handle," it having a curved or bow-shaped shank, $e$, and a hand-piece, $f$, is employed, the curved shank being socketed to fit and be freely rotated upon the ends $b$ of the handle-bar.

The spade-handle is applied to the handle-bar when the nut $d$ is removed, and after which the nut is turned upon the screw-threaded portion $c$ at the end of the handle-bar and employed to tightly bind or clamp the said spade-handle in any desired position or angle with relation to the handle-bar or to the steering-fork.

It will be understood that riders of different height require the hand-piece $f$ at different angles, and to accomplish this result effectually an adjusting device either of the construction above described or its equivalent is provided.

I claim—

The improved article of manufacture herein described, consisting of the velocipede handle-bar $a$, having its ends $b$ of reduced diameter, and provided with the shoulders 2 and the terminal screw-threads $c$, combined with the spade-handles having the socketed shanks $e$, fitted to rotate upon said reduced ends of the handle-bar, and the nuts $d$, applied to the screw-threads on the bar-terminals and next to the inner surfaces of the socketed shanks, to admit of the securing of the handles to the handle-bar at various angles, substantially as set forth.

In testimony whereof I have signed my name to this specification, in the presence of two subscribing witnesses.

HARRY D. HEDGER.

Witnesses:
BERNICE J. NOYES,
C. M. CONE.